United States Patent [19]

Pendleton

[11] 4,215,869
[45] Aug. 5, 1980

[54] SPLINED SHAFT SEAL ARTICLE AND APPARATUS

[75] Inventor: Darrell D. Pendleton, Gastonia, N.C.

[73] Assignee: Garlock Inc., Longview, Tex.

[21] Appl. No.: 30,075

[22] Filed: Apr. 16, 1979

[51] Int. Cl.² ............................................. F16J 15/56
[52] U.S. Cl. ........................................ 277/12; 277/181;
  277/215; 277/95; 403/359; 64/9 R; 64/23
[58] Field of Search ......................... 64/9 R, 9 A, 23;
  403/359; 277/180–186, 215, 92, 95, 12, 31

[56] References Cited
U.S. PATENT DOCUMENTS

| | | | |
|---|---|---|---|
| 2,994,571 | 8/1961 | Peras | 277/181 X |
| 3,197,216 | 7/1965 | Jackson | 403/359 X |
| 3,227,985 | 1/1966 | Hardison et al. | 403/359 X |
| 3,313,124 | 4/1967 | Filepp | 64/9 R |
| 3,508,418 | 4/1970 | Jones | 64/23 |
| 3,788,100 | 1/1974 | Pitner | 277/95 X |
| 3,913,924 | 10/1975 | Barefoot et al. | 277/181 X |
| 4,153,260 | 5/1979 | Joyner | 277/215 X |

Primary Examiner—Robert S. Ward, Jr.
Attorney, Agent, or Firm—Schovee & Boston

[57] ABSTRACT

A seal 10 for sealing between a splined shaft 30 and a housing 32 having a bore 34 through which the splined shaft 30 extends. The seal 10 includes a shell 12 and an elastomeric body 14 bonded thereto. The body 14 includes a mounting portion 16 and a toothed seal portion 18 having a plurality of seal teeth 42 that are matingly received in the grooves 48 in the splined shaft. The seal teeth 42 are molded to provide interference "y" at the top and bottom of the teeth 42 and interference "x" at the sides; $x \geq 150\%$ y. The seal 10 also has a seal 24 to seal against the housing 32.

36 Claims, 5 Drawing Figures

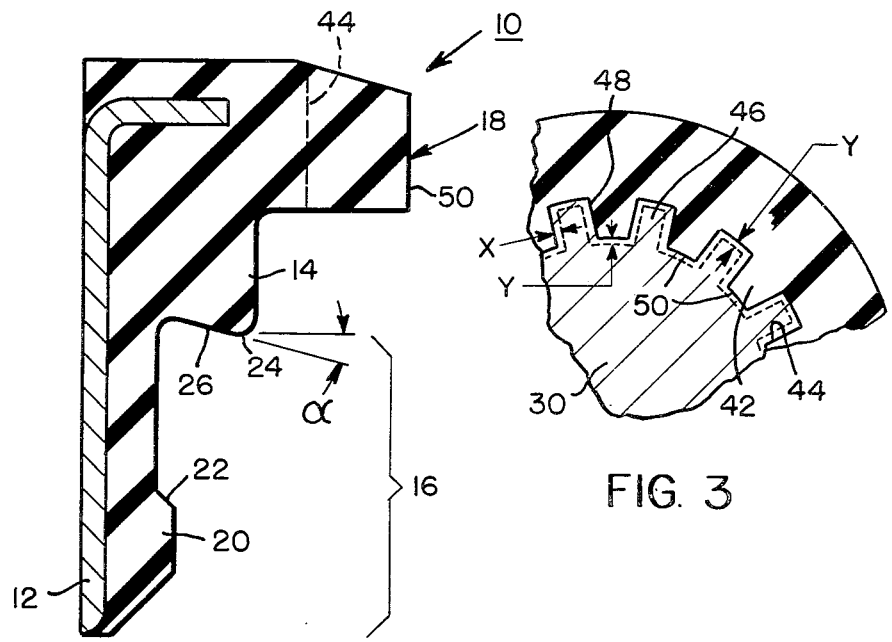
FIG. 1
FIG. 3
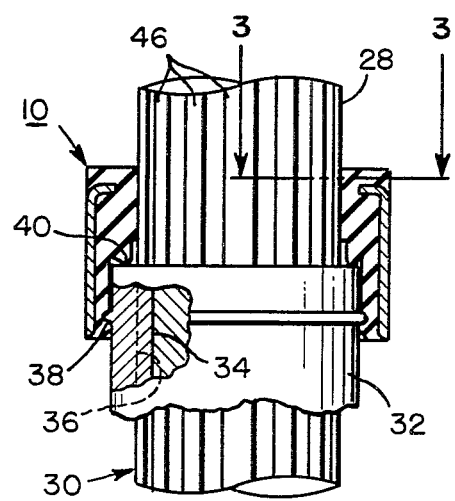
FIG. 2

SPLINED SHAFT SEAL ARTICLE AND APPARATUS

TECHNICAL FIELD

This invention relates to seals and in particular to a seal for use between the splined portion of a shaft and a housing having a bore through which the shaft extends in relative reciprocating movement.

BACKGROUND OF THE PRIOR ART

Current seal designs are made with a non-elastomeric element which, under tension, takes a permanent set consequently losing the initial interference with the splined teeth. Further, an expensive thread operation is provided in order to hold the seal in position on the housing. However, the metal to metal threads do not provide for a positive seal between the seal and the housing. This type of previous seal is also easily damaged during installation and one or more of the component parts can become lost due to the loose assembly. These current dust cap seals are three piece seals consisting of: (1) an outer case, (2) an inner retainer ring with the approximate shape of the splined teeth, and (3) the sealing element itself, which is usually cork or felt material. This type of seal offers very little sealability due to the materials used and the construction of the sealing areas. The three piece construction affects the assembly operation by making it more difficult and leak paths can occur through the mating surfaces of the constructed pieces. Lip type seals are also used in splined shaft applications, however, they cannot seal in the splined area so they are limited in use to a smooth surface adjacent to the splined area. In most applications, the splined section of the shaft must pass through the lip of the seal during installation and this can result in damage to the seal.

It is an object of the present invention to provide an improved splined shaft seal that overcomes the problems mentioned above that are inherent in the prior art seals. It is a further object of the present invention to provide a splined shaft seal having an elastomeric element that is not easily damaged during installation and that is designed to either press on or screw on the spline housing without having first been pushed over the splined shaft. It is another object of the present invention to provide such a seal having elastomeric teeth adapted to mate with the grooves in the splined shaft and having an interference that provides proper sealing. It is another object of the present invention to provide a positive seal between the seal and the housing through which the splined shaft extends.

BRIEF SUMMARY OF THE INVENTION

A splined shaft seal and apparatus including a splined shaft, a housing having a bore through which the shaft extends, and a seal for sealing between the splined shaft and the housing. In addition, the seal includes means for sealing between the seal and the housing. The seal includes an annular metal shell and a molded elastomeric body bonded to the shell. The elastomeric body includes a mounting portion for mounting the seal onto the housing and a toothed seal portion. The toothed seal portion includes a plurality of identical, circumferentially equally spaced-apart, radially inwardly extending seal teeth separated by a plurality of identical seal grooves, each seal tooth being adapted to fit in a respective groove of a splined shaft. The seal teeth having side walls tapering from a wider width at their base to a narrower width at their top. The seal teeth are molded with a size so as to provide, when installed on a splined shaft, an interference "y" between the top of the spline teeth and the base of the seal groove, and an interference "x" between each side of the seal teeth and the spline teeth. Further, according to the present invention $x \geq 150\%\ y$, and in a preferred embodiment, x is about three times as great as y.

The mounting portion of the seal can include internal molded, elastomeric screw threads for mating with external screw threads on the O.D. of the housing, or can include an annular, radially inwardly extending rib having a radial shoulder facing axially outwardly and adapted to be snap-locked over an annular radial shoulder on the housing facing axially inwardly. In addition, the seal mounting portion includes means for providing a seal between the seal and the housing, including an additional elastomeric seal facing axially inwardly and adapted to contact a radial surface of the housing when the seal is mounted thereon. In addition, the elastomeric part of the seal can be two separate pieces including a mounting portion bonded to the shell and a separate toothed seal portion that can rotate relative to the mounting portion to aid in installation.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIG. 1 is a cross-sectional partial view through a seal according to a preferred embodiment of the present invention;

FIG. 2 is a partly cross-sectional view through an apparatus according to the present invention including a splined shaft, a housing such as a slip yoke and a seal as shown in FIG. 1;

FIG. 3 is a partial cross-sectional view along line 3—3 in FIG. 2;

DETAILED DESCRIPTION OF THE INVENTION

Figure 4:
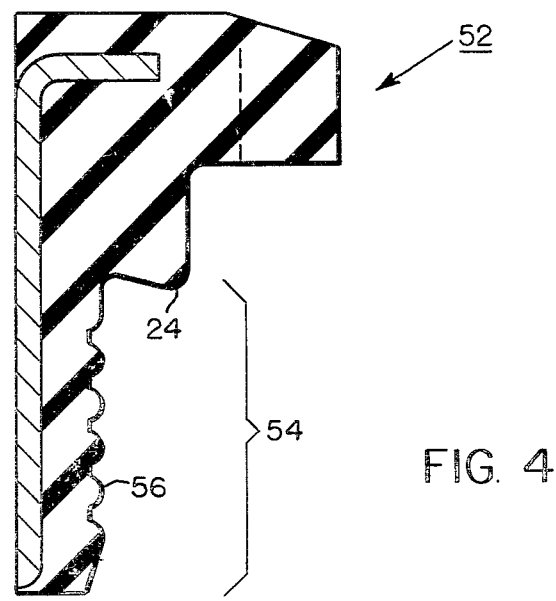
FIG. 4 is a cross-sectional partial view of a seal according to another embodiment of the present invention.

With reference now to the drawings, FIG. 1 shows a seal 10 according to a preferred embodiment of the present invention. The seal 10 includes an annular metal shell 12 and a molded annular elastomeric body 14 bonded to the shell 12. The elastomeric body 14 includes a mounting portion 16 and an annular toothed seal portion 18 (described in more detail below with respect to FIG. 3).

The mounting portion 16 includes an annular, radially inwardly extending rib 20 having a shoulder 22 (preferably at an angle of about 45° to a plane perpendicular to the seal axis) adapted to lock the seal 10 onto the housing (as described in more detail below with respect to FIG. 2). The mounting portion also includes means for providing a seal between the seal 10 and a housing (see housing 32 in FIG. 2). This sealing means includes an annular elastomeric seal 24 facing axially inwardly (the direction "axially inwardly" is hereby defined for use in the present specification and claims to mean the direction vertically down in FIG. 2, that is, the direction into the housing 32, and the term "axially outwardly" means the opposite direction, i.e. vertically up in FIG. 2). The seal 24 is adapted to contact a radial surface 40 of the housing 32 when the seal 10 is mounted thereon (see FIG. 2). The seal 24 is formed on a surface 26 which extends substantially radially inwardly and axially inwardly at an acute angle "α" to a plane perpendicular to the seal axis. According to the present invention $\alpha \geq 10°$.

FIG. 2 shows the seal 10 as installed for sealing between the splined end 28 of a shaft 30 and a housing 32 such as a slip yoke. In this particular embodiment, the housing 32 has a bore 34 therein having grooves 36 in the bore 34 of a size and shape adapted to matingly receive the splined end 28 of the shaft 30 which is mounted for relative reciprocating movement in the housing bore 34. The seal 10 seals between the splined end 28 and the housing 32 by means of the toothed seal portion 18 (described in detail below with reference to FIG. 3). The housing 32 includes on its O.D. surface an annular radial shoulder 38 facing axially inwardly for snap-locking engagement with the shoulder 22 on the rib 20 of the seal 10. The shoulder 38 can be on a annular rib or flange as shown in FIG. 2 or it can be in an annular groove formed in the O.D. of the housing 32. The mounting portion 16 of the seal 10 is sized such that when the shoulder 22 thereof is in locking engagement with the shoulder 38, the seal 24 is in sealing contact or engagement with the front radial surface 40 of the housing 32, to provide a seal between the seal 10 and the housing 32.

FIG. 3 is an enlarged partial cross-sectional view along line 3—3 in FIG. 2 showing the mating engagement between the splined end 28 of the shaft 30 and the toothed seal portion 18 of the seal 10. As shown in FIG. 3, the seal 10 includes a plurality of identical, circumferentially equally spaced-apart, radially inwardly extending seal teeth 42 separated by a plurality of identical grooves 44. The splined end 28 of the shaft 30 includes a plurality of identical, circumferentially equally spaced-apart, radially outwardly extending spline teeth 46. The seal 10 has an as-molded shape and size shown by the dotted line in FIG. 3. The seal 10 when it is installed onto the splined end 28 of the shaft stretches radially outwardly and circumferentially so as to fit over the splined end 28. Thus, FIG. 3 shows (by virtue of the dotted line) the designed interference as will be understood by one skilled in the art. According to the present invention, to provide the interference required for improved or optimum seal, the "x" dimension should be greater than or equal to 150% of the "y" dimension. During installation, the seal stretches outwardly, however, since the body 14 is a synthetic rubber or elastomer it is essentially a hydraulic fluid which is not compressible but it is displaceable. According to the present invention, the rubber that is displaced when the seal teeth 42 are forced into the groove 48 of the shaft 30, is moved radially inwardly so as to fill the bottom of the groove 48 and provide the desired interference both at the bottom of the grooves and at the sides thereof.

FIG. 4 shows a seal 52 according to another embodiment of the present invention, which is identical to the seal 10 in FIG. 1 except that the elastomeric mounting portion 54 is provided with molded-in screw threads 56 adapted to mate with corresponding screw threads on the O.D. of a housing. In this embodiment, the seal 52 simply is screw threaded onto a housing until the seal 24 is in sealing engagement with the surface 40 of the housing.

Figure 5:
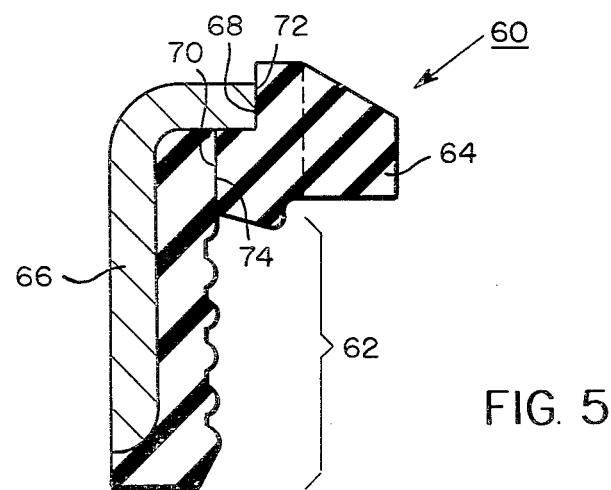
FIG. 5 is a cross-sectional, partial view of a seal according to a still further embodiment of the present invention.

FIG. 5 shows another embodiment of the present invention of a seal 60 which is similar to that shown in FIG. 1 except that the seal 60 has a two-part elastomeric body including a mounting portion 62 bonded to a shell 66, and a separate elastomeric, toothed seal portion 64. The two portions are molded separately and then the toothed portion 64 is installed into the mounting portion 62. The mounting portion 62 can have either a screw threaded surface as shown in FIG. 4 or it can include a snap-lock configuration as shown in FIG. 1. The toothed portion 64 is sufficiently free to allow the mounting portion 62 to be threaded (or snap-locked) onto the housing prior to installation therethrough of the shaft 30, that is, the portion 64 can be rotated to mesh with the shaft. The mounting portion 62 has a cylindrical part and a radial flange extending radially inwardly and the seal portion 64 includes a cylindrical part and a radial flange extending radially outwardly. The I.D. 72 of the radial flange of the mounting portion 62 is substantially equal to the O.D. 68 of the cylindrical part of the seal portion 64, and the I.D. 74 of the cylindrical part of the mounting portion 62 is substantially equal to the O.D. 70 of the radial flange of the seal portion 64.

In one preferred embodiment, the splined end 28 has an O.D. of 1.372 inch and a spline I.D. of 1.064 inch. The toothed seal portion 18 of the as-molded seal 10 has an O.D. of 1.363 inch and an I.D. of 1.053 inch. Thus, the value of y at the top of the spline teeth 46 was 0.0045 inch and the value y at the bottom is substantially the same or 0.0055 inch. In this embodiment, $x \times 0.014$ inch. Further, the width of the grooves 44 was 0.120 inch, there were 16 teeth 42, and the housing 32 was a slip yoke and the shaft 30 was a propeller shaft tube having a splined end 28.

The seal of the present invention can be mounted to the housing other than on its O.D., such as on an I.D. or on the end thereof, and can be used with a housing having a bore larger than the O.D. of the splined shaft (that is, on a housing not having mating grooves 36).

The invention has been described in detail with particular reference to the preferred embodiments thereof, but it will be understood that variations and modifications can be affected within the spirit and scope of the invention as described hereinafter and as defined in the appended claims.

I claim:
1. Apparatus comprising:
 (a) a shaft having a splined end with a plurality of identical, circumferentially equally spaced-apart, radially outwardly extending spline teeth separated by a plurality of identical grooves;
 (b) a housing having a bore therein and said splined end of said shaft extending into said bore for reciprocating movement therein;
 (c) a seal mounted on said housing and in sealing contact with said splined end of said shaft;
 (d) said seal comprising:
  (1) a unitary molded elastomeric body;
  (2) said seal including a mounting portion mounting said seal on said housing; and
  (3) said elastomeric body including an annular toothed seal portion having a plurality of identi- cal, circumferentially equally spaced-apart, radially inwardly extending seal teeth separated by a plurality of identical grooves, each seal tooth fitting in a respective groove of said splined shaft in sealing contact therewith, said seal teeth having sidewalls tapering from a wider width at their base to a narrower width at their top, said seal teeth having an interference "y" between the top of the spline teeth and the groove of the seal teeth and having an interference "x" between each side of the spline teeth and the seal teeth, and $x \geq 150\%$ y.

2. The apparatus according to claim 1 wherein said seal also includes an annular metal shell, wherein said molded elastomeric body is bonded to said shell, wherein said housing bore has teeth and grooves and said spline teeth are matingly received in said housing bore grooves, and wherein said mounting portion of said seal is a part of said molded elastomeric body, and wherein said seal teeth also have an interference between the top of the seal teeth and the groove between the spline teeth of substantially y.

3. The apparatus according to claim 2 wherein said seal includes means for sealing between said seal and said housing to eliminate leak paths therebetween.

4. The apparatus according to claim 3 wherein said sealing means includes an annular elastomeric seal facing axially inwardly and in contact with a radial surface of said housing.

5. The apparatus according to claim 4 wherein said annular elastomeric seal includes a surface extending radially inwardly and axially inwardly at an acute angle $\alpha$ to a plane perpendicular to the seal axis, and wherein $\alpha \geq 10°$.

6. The apparatus according to claim 2 wherein said mounting portion includes molded, elastomeric internal screw threads mating with external screw threads on the O.D. of said housing.

7. The apparatus according to claim 2 wherein said housing includes, on its O.D. surface, an annular radial shoulder facing axially inwardly, wherein said seal mounting portion includes an annular, radially inwardly extending rib having a radial shoulder facing axially outwardly, and wherein said shoulders are in locking engagement with each other, whereby said seal is snap-locked onto said housing by pushing said seal onto said housing.

8. The apparatus according to claim 7 wherein said seal includes means for sealing between said seal and said housing to eliminate leak paths therebetween.

9. The apparatus according to claim 8 wherein said sealing means includes an annular elastomeric seal facing axially inwardly and in contact with a radial surface of said housing.

10. The apparatus according to claim 9 wherein said annular elastomeric seal includes a surface extending radially inwardly and axially inwardly at an acute angle $\alpha$ to a plane perpendicular to the seal axis, and wherein $\alpha \geq 10°$.

11. The apparatus according to claim 10 wherein said housing is a slip yoke and said shaft is a propeller shaft tube having a splined end.

12. The apparatus according to claim 11 wherein x is approximately equal to 300% of y.

13. The apparatus according to claim 11 wherein y is about 0.004 inch, and x is about 0.014 inch.

14. The apparatus according to claim 7 wherein said shoulders each are at an angle of about 45° to a plane perpendicular to the seal axis.

15. In an apparatus including a shaft having a splined end, a housing having a bore therein, said splined end of said shaft extending into said bore, and a seal mounted on said housing and in sealing contact with said splined end of said shaft the improvement wherein said seal comprises a unitary molded elastomeric body including an annular toothed seal portion having a plurality of identical, circumferentially equally spaced-apart, radially inwardly extending seal teeth separated by a plurality of identical grooves, each seal tooth fitting in a respective groove of said splined shaft, said seal teeth having side walls tapering from a wider width at their base to a narrower width at their top, said seal teeth having an interference y between the top of the spline teeth and the groove of the seal teeth, and having an interference x between each side of the spline teeth and the seal teeth, and wherein $x \geq 150\%$ y.

16. The apparatus according to claim 15 wherein said seal teeth also have an interference between the top of the seal teeth and the bottom of the groove of the spline teeth of substantially y.

17. The apparatus according to claim 16 wherein said elastomeric body includes a mounting portion with means for mounting said seal on said housing and wherein said mounting portion also includes sealing means separate from said toothed seal portion for sealing against said housing.

18. The apparatus according to claim 17 wherein said sealing means includes an annular elastomeric seal facing axially inwardly and adapted to contact a radial surface of said housing when said seal is mounted thereon.

19. The apparatus according to claim 17 wherein said annular elastomeric seal is formed on a surface extending radially inwardly and axially inwardly at an acute angle $\alpha$ to a plane perpendicular to the seal axis, and wherein $\alpha \geq 10°$.

20. The apparatus according to claim 17 wherein said mounting portion includes molded, elastomeric internal screw threads adapted to engage external screw threads on a housing.

21. The apparatus according to claim 17 wherein said housing includes, on its O.D. surface, an annular radial shoulder facing axially inwardly, and wherein said seal mounting portion includes an annular, radially inwardly extending rib having a radial shoulder facing axially outwardly, and said shoulders being in locking engagement with each other, whereby said seal is snap-locked onto said housing by pushing said seal onto said housing.

22. An annular seal for a splined shaft comprising:
(a) an annular metal shell;
(b) a unitary molded elastomeric body bonded to said shell;
(c) said body including a mounting portion for mounting said seal on a housing, said mounting portion including an annular elastomeric seal adapted to contact a surface of a housing when said seal is mounted on a housing to provide a seal therebetween; and
(d) said body also including an annular toothed seal portion having a plurality of identical, circumferentially equally spaced-apart, radially inwardly extending seal teeth separated by a plurality of identical grooves, each of said teeth having side walls tapering from a wider width at their base to a narrower width at their top.

23. The article according to claim 22 wherein said mounting portion has an I.D. surface adapted to mount on an O.D. surface of a housing.

24. The article according to claim 23 wherein said seal mounting portion includes molded screw threads on said I.D. surface for engaging external screw threads on the O.D. of a housing.

25. The article according to claim 23 wherein said mounting portion includes an annular, radially inwardly extending rib having a shoulder facing axially outwardly, said shoulder being adapted to snap-lock against an axially inwardly facing shoulder on a housing.

26. The article according to claim 23 wherein said annular elastomeric seal is formed on a surface extending radially inwardly and axially inwardly at an acute angle $\alpha$ to a plane perpendicular to the seal axis, and wherein $\alpha \geq 10°$.

27. The article according claim 22 wherein said seal teeth are molded with an interference y at said teeth grooves, and with an interference x at each side of said seal teeth, and wherein $x \geq 150\%$ y.

28. The article according to claim 27 wherein said seal teeth are also molded with an interference substantially equal to y at their top.

29. Apparatus comprising:
   (a) a shaft having a splined end which a plurality of identical, circumferentially equally spaced-apart, radially outwardly extending spline teeth separated by a plurality of identical grooves;
   (b) a housing having a bore therein and said splined end of said shaft extending into said bore for reciprocating movement therein;
   (c) a seal mounted on said housing and in sealing contact with said splined end of said shaft;
   (d) said seal comprising:
      (1) a pair of separate, molded, annular, elastomeric portions including a mounting portion mounting said seal on said housing, and an annular toothed seal portion;
      (2) said mounting portion including a cylindrical part and a radial flange extending radially inwardly and said seal portion including a cylindrical part and a radial flange extending radially outwardly, the I.D. of the radial flange of the mounting portion being substantially equal to the O.D. of the cylindrical part of the seal portion, and the I.D. of the cylindrical part of the mounting portion being substantially equal to the O.D. of the radial flange of the seal portion; and
      (3) said seal portion having a plurality of identical, circumferentially equally spaced-apart, radially inwardly extending seal teeth separated by a plurality of identical grooves, each seal tooth fitting in a respective groove of said splined shaft in sealing contact therewith, and said seal teeth having sidewalls tapering from a wider width at their base to a narrower width at their top.

30. The apparatus according to claim 29 wherein said seal teeth have an interference "y" between the top of the spline teeth and the groove of the seal teeth and have an interference "x" between each side of the spline teeth and the seal teeth, and $x \geq 150\%$ y.

31. The apparatus according to claim 30 wherein said seal teeth also have an interference between the top of the seal teeth and the bottom of the groove of the spline teeth of substantially y.

32. The apparatus according to claim 29 wherein said seal also includes an annular metal shell, wherein said mounting portion is bonded to said shell, wherein said housing bore has teeth and grooves and said spline teeth are matingly received in said housing bore grooves.

33. The apparatus according to claim 29 wherein said housing is a slip yoke and said shaft is a propeller shaft tube having a splined end, and wherein x is approximately equal to 300% of y.

34. An annular seal for a splined shaft comprising:
   (a) an annular metal shell;
   (b) a pair of separate, molded, annular elastomeric portions including a mounting portion for mounting said seal on a housing, and an annular toothed seal portion;
   (c) said mounting portion including a cylindrical part and a radial flange extending radially inwardly and said seal portion including a cylindrical part and a radial flange extending radially outwardly, the I.D. of the radial flange of the mounting portion being substantially equal to the O.D. of the cylindrical part of the seal portion, and the I.D. of the cylindrical part of the mounting portion being substantially equal to the O.D. of the radial flange of the seal portion; and
   (d) said seal portion having a plurality of identical, circumferentially equally spaced-apart, radially inwardly extending seal teeth separated by a plurality of identical grooves, each seal tooth fitting in a respective groove of said splined shaft in sealing contact therewith, and said seal teeth having sidewalls tapering from a wider width at their base to a narrower width at their top.

35. The apparatus according to claim 34 wherein said seal teeth have an interference "y" between the top of the spline teeth and the groove of the seal teeth and have an interference "x" between each side of the spline teeth and the seal teeth, and $x \geq 150\%$ y.

36. The apparatus according to claim 35 wherein said seal teeth also have an interference between the top of the seal teeth and the bottom of the groove of the spline teeth of substantially y.

* * * * *